B. GRANVILLE.
ARMORED TIRE.
APPLICATION FILED JULY 18, 1917.
1,338,011.
Patented Apr. 27, 1920.
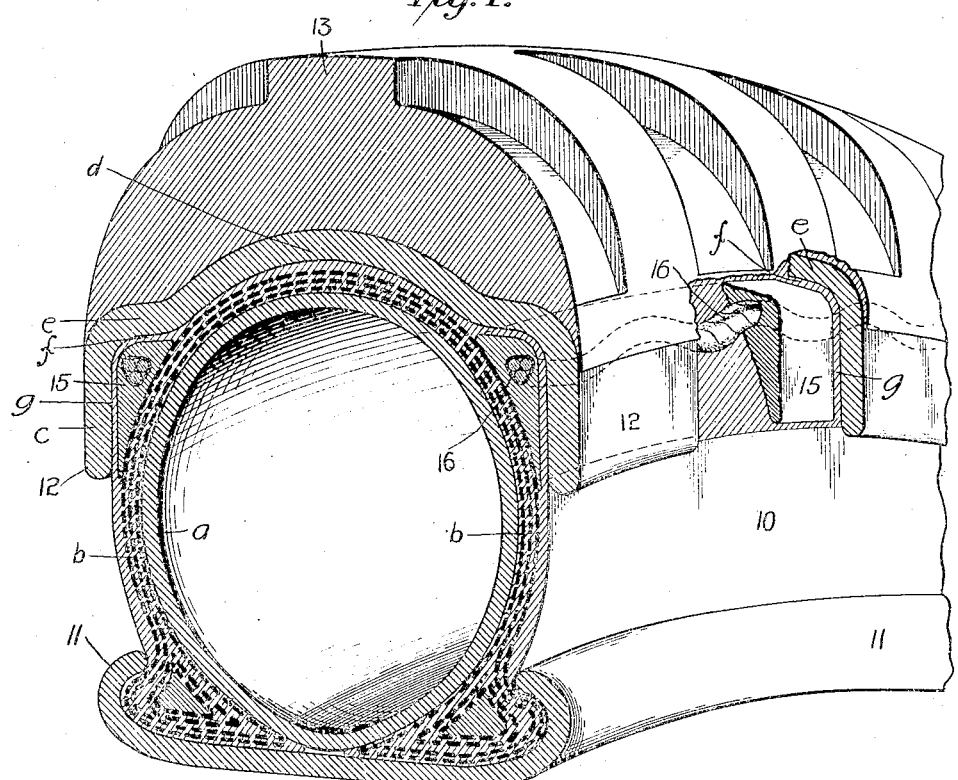
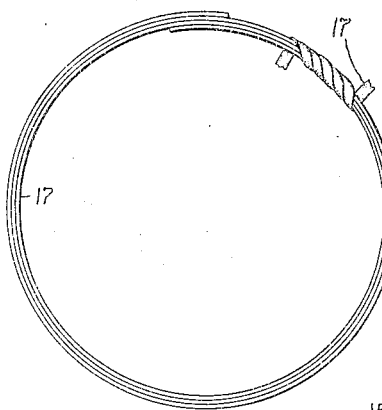
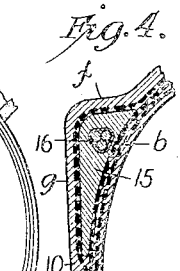
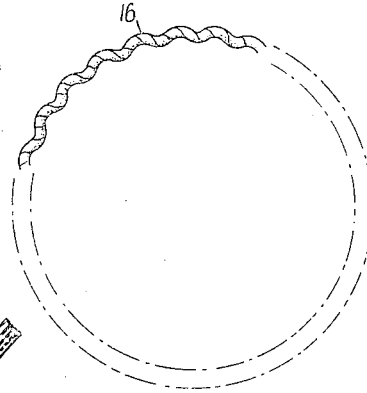
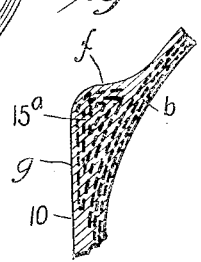
WITNESSES:
INVENTOR.
Bernard Granville
BY
his ATTORNEY

UNITED STATES PATENT OFFICE.

BERNARD GRANVILLE, OF NEW YORK, N. Y.

ARMORED TIRE.

1,338,011.　　Specification of Letters Patent.　　Patented Apr. 27, 1920.

Application filed July 18, 1917. Serial No. 181,192.

*To all whom it may concern:*

Be it known that I, BERNARD GRANVILLE, a citizen of the United States, residing at New York city, in the county of New York and State of New York, have invented certain new and useful Improvements in Armored Tires, fully described and represented in the following specification and the accompanying drawings, forming a part of the same.

This invention relates to pneumatic tires for automobiles and other vehicles. In U. S. Patent No. 1,213,096, granted to me January 16, 1917, there is described and claimed an armored pneumatic tire comprising a flexible annular inflatable body and a floating rigid armor rim mounted on the periphery of said body, said rim having inwardly extending side flanges approximately parallel to the plane of the axis of the tire, and the flexible body being formed to fit within and to bear outwardly against said side flanges. With such a tire, if the peripheral portion of the tire body is sufficiently flexible, there is danger in running with the tire deflated of the armor rim being cast off from the body unless the side flanges of the rim are made deeper than is otherwise most desirable.

The present invention has been made with the object of overcoming this danger and avoiding all possibility of the casting of the armor rim of a tire of this kind. To this end, I form the peripheral rim engaging portion or portions of the flexible inflatable body to have the property or power of resisting such bending or flexing in running as would cause or permit the casting of the rim.

A full understanding of the invention can best be given by a detailed description of a tire embodying the features of the invention in the form now considered best, and such a description will now be given in connection with the accompanying drawings showing such a tire. In said drawings:—

Figure 1 is a sectional perspective view of part of a tire embodying the invention, partly broken away and showing also a part of a wheel felly to which the tire is attached;

Fig. 2 is a detail small scale view showing partly completed one of the semi-rigid strands which are used in the rim-engaging shoulders or ribs of the tire body, as shown in Fig. 1;

Fig. 3 is a view similar to Fig. 2 but showing the annular semi-rigid strand completed in condition to be used in making a tire body; and Fig. 4 is a detail sectional view showing a modified body construction; and Fig. 5 is a detail sectional view illustrating an alternative form of semi-rigid strand.

Referring to the drawings, the tire shown in Fig. 1 comprises an annular tubular inflatable body 10 and a continuous outer puncture-resisting rim 12 applied to the peripheral or outer portion of the body casing. The body in the particular form shown is constructed like an ordinary inner tube clencher pneumatic tire, having a thin inner air tube *a* of flexible rubber, and an outer casing *b* of rubber and fabric split or open circumferentially at its inner side and having its edges formed in the usual manner to engage the inturned edges of a metal clencher rim 11 of the wheel felly. The outer armor rim 12 is a rigid metal channel rim having side flanges *c* which extend inwardly approximately parallel to each other and to the plane of the axis of the tire (such plane being at right angles to the wheel axis, or axis of rotation of the tire), and in the form shown having its intermediate portion between the flanges transversely flat adjacent the flanges and with an outward bulge *d* between the flat parts *e*. The rim is provided with a cushion tread 13. The peripheral or outer portion of the body casing *b* is shaped to fit within the channel of the rim 12 between its side flanges, being for this purpose formed with circumferentially extending outwardly projecting portions or ribs 15 forming shoulders to fit between the rim flanges, and having faces *f* to bear against the outer flat parts *e* of the rim and side faces *g* to bear against the flanges *c*, said faces *g* being approximately parallel to each other and to the plane of the axis of the casing. The side faces of the ribs 15 and the inner sides or faces of the flanges *c* thus provide oppositely engaging circumferentially extending faces by which the rim 12 is held against lateral displacement relatively to the body 10. For a rim of the cross-sectional shape shown in Fig. 1, the part of the body casing between the rectangular ribs 15 will be formed to extend into and seat against the circumferential bulge *d*. The fabric for giving strength to the body casing *b* should extend about the casing substantially parallel with the inner surface thereof, as indicated in the drawing.

The armor rim 12 is not cemented or otherwise secured to the body 10, relative circumferential movement between the rim and body being, except for possible slight creeping as when braking the car, prevented by the friction due to the pressure of the body against the flanges and intermediate portion of the rim, the rim being thus left free to move out from the body at the top of the wheel in the event of excessive shock imparted to the tire at the bottom. In order that the peripheral or outer portion of the inflatable body shall be pressed tightly into the channel of the rigid outer rim and against both the intermediate portion of the rim and its side flanges, and in order that it may follow the movement of the rim in the direction away from the wheel felly under ordinary shock, the inflatable body should most desirably be of such size or so constructed that when under inflation without the metal rim being in place its circumference will be somewhat greater than the circumference of the inner face of the rim and the distance between the side faces of its rim engaging ribs will be somewhat greater than the distance between the engaging faces of the rim flanges. The tire as so far described is or may be substantially as shown and more fully described in my said Patent No. 1,213,096.

When the inner or air tube $a$ of a tire made as above described become deflated, the body 10 collapses at the bottom of the tire under the weight of the car, and at the top of the tire the body pulls downward somewhat relatively to the upper part of the armor rim 12. In running with a tire thus collapsed, unless the side flanges of the armor rim are made deep enough to avoid such result and deeper than is otherwise desirable, there is danger of the body working out from within the rim at the top of the tire with the result of the rim being cast off from the body if the ribs or shoulders 15 are formed simply of flexible rubber or rubber composition, or otherwise formed so as to be approximately of the same degree of flexibility as the balance of the outer portion of the inflatable body. To avoid such casting of the armor rim, I form the body casing $b$ with means for preventing such bending or flexing thereof as may cause rim casting, most desirably, and as shown, by forming the rim engaging ribs or shoulders 15 so that they shall be semi-rigid or have the necessary property of resisting bending or flexing. When the body casing is so formed, the bending or flexing of the casing which causes or permits the casting of the armor rim when the casing is not thus stiffened does not occur, and, the semi-rigid portions of the body being of greater diameter than the inner edge of the rim flanges, the danger or possibility of the rim being cast is effectually obviated, and it no longer becomes necessary to increase the depth of the side flanges of the rim beyond such depth as is otherwise desirable. A rim having flanges of the proportionate depth shown in Fig. 1 has been found entirely satisfactory.

The required semi-rigidity, or bend-resisting property, of the peripheral portion of the body casing may be provided in various ways, and when semi-rigid or normally non-flexing ribs 15 are employed these ribs may be formed in various ways to give the desired semi-rigidity. Most desirably I form the ribs of strands of rubber composition containing a sufficient amount of sulfur to give it the desired stiffness or semi-rigidity when vulcanized, and provide them with a coating or skin of soft rubber or rubber composition which extends over the rest of the body casing. Most desirably, also, there is embedded in such semi-rigid strand one or more annular circumferentially extending metal strands 16 to give the desired degree of rigidity without the necessity of carrying the hardening of the rubber in the rib to such degree as might result in danger of its fracturing in use.

The metal strand is best formed of steel or other suitable wire wound to provide an annular strand of several wires, and the rim is most desirably crimped to a sinuous or serpentine form, see Figs. 1 and 3, so that it shall be slightly extensible. Slight extensibility of the ribs 15 resulting from such crimping of the metal strand is of advantage in that it permits a slight circumferential expansion of the ribs under the inflating pressure, thereby insuring in all cases the desired bearing pressure of the faces $f$ of the ribs against the faces $e$ of the rim, even though the body casing is not formed exactly to size. This desirable slight extensibility is also attained when the ribs 15 are made wholly of semi-hard or semi-rigid rubber composition without the embedded wire strands.

The annular wire strands to be embedded in the ribs 15 may be formed by winding a suitable wire, such as, for example, a $\frac{1}{16}''$ gage steel wire, spirally to provide a strand of three or four or more wires, and then wrapping the wires with a rubber frictioned tape 17 as indicated in Fig. 2. The wrapped annular strand thus produced being then passed between crimping rollers to give the strand a crimped or serpentine formation; or the wire may be passed between crimping rolls or otherwise given a crimped or serpentine form before being formed into a ring. The wrapped slightly extensible strands are inserted in beads or strands of rubber or rubber composition, which are then placed in molds and vulcanized. The annular strands or beads thus formed are placed and secured in proper position on the outside of the partially built-up body casing, and the outer layer or skin of rubber is then applied over the whole outside of the body casing and the casing is vulcanized in the ordinary way.

If the semi-rigid peripheral strands of the tire were absolutely rigid or non-flexible, the tire body could not be placed in the rigid armor rim. The strands for giving the desired degree of rigidity to the peripheral portion of the body casing must, therefore, be only semi-rigid or of such a degree of rigidity as will permit of the bodies being readily placed in and removed from the armor rim when the body is removed from the felly rim, while yet serving to prevent such bending or flexing of the peripheral portion of the body in running as must occur before the rim will be cast. The use of absolutely rigid strands would also be objectionable in that they would hinder or prevent the desired full frictional contact between the peripheral portion of the body and the inner faces of the armor rim.

A body such as shown provided with semi-rigid strands is readily placed in position in the channel armor rim by flexing the body in a triple curve before it is mounted on the wheel felly or felly rim, and may be removed from the armor rim in a similar manner by bending a portion of the tire body inward away from the armor rim after the tire has been removed from the felly rim.

Fig. 5 shows in section a part of a tire body casing similar to that shown in Fig. 1, but having a semi-rigid rim-engaging rib 15ª formed of a strand of wrapped or folded canvas frictioned with rubber and covered by the outer layer or skin of the tire body. Many other ways of forming the semi-rigid ribs on the tire body or of otherwise giving the peripheral portion of the tire body the desired semi-rigidity or bend-resisting property, will suggest themselves.

The semi-rigid rubber composition or other semi-rigid or semi-hard material forming the ribs 15 or part thereof is most desirably extended inward as shown in Fig. 1 sufficiently so that when the armor rim is in position on the tire body the inner edges of the ribs will be approximately opposite or slightly within the inner edges of the rim flanges so as to strengthen and protect the body casing at the lines or portions of thrust against the edges of the rim flanges. The outside layer of fabric of the body casing is best laid to extend outside the ribs 15 as shown by Fig. 4, so as to aid in holding the rib forming bead or strand securely in place and to give added wearing strength to the faces which bear against the rim flanges.

It may be noted that it is of advantage to have the intermediate portion of the peripheral part of the body casing between the semi-rigid ribs of ordinary canvas and rubber construction as indicated by the drawings, or of other suitable construction so that this portion of the tire will be so flexible and sufficiently extensible as to readily adapt itself to the rim and to permit the side faces of the rim-engaging ribs to bear outwardly against the rim flanges.

What is claimed is:

1. An armored pneumatic tire comprising a flexible annular inflatable body and a floating rigid armor rim mounted on the periphery of said body, said rim consisting of a metal annulus formed with oppositely engaging faces extending longitudinally of the tire in planes approximately parallel to the plane of the axis of the tire, and the flexible body being formed with rim engaging portions having approximately parallel faces to bear against said engaging faces of the rim whereby the rim is held against lateral displacement relatively to the body, said rim engaging portions of the body comprising semi-rigid circumferentially extending annular strands whereby such bending of the rim engaging portions of the body as might cause the casting of the armor rim when the tire is used deflated is prevented.

2. An armored pneumatic tire comprising a flexible annular inflatable body and a floating rigid armor rim mounted on the periphery of said body, said rim consisting of a metal annulus formed with inwardly extending side flanges approximately parallel to the plane of the axis of the tire, and the flexible body having its peripheral portions formed to fit between and to bear outwardly against said side flanges and stiffened to prevent such bending in use as might cause the casting of the armor rim when the tire is deflated, the rim being supported and held against lateral displacement solely by the flexible body and being free to move radially outward relatively to the body under excessive shock.

3. An armored pneumatic tire comprising a flexible annular inflatable body and a floating rigid armor rim mounted on the periphery of said body, said rim consisting of a metal annulus formed with inwardly extending side flanges approximately parallel to the plane of the axis of the tire, and the flexible body being formed with circumferentially extending outwardly projecting portions forming shoulders to fit between and having approximately parallel side faces to bear outwardly against said side flanges, said outwardly projecting portions comprising semi-rigid slightly extensible circumferentially extending strands, the rim being supported and held against lateral displacement solely by the flexible body and being held against movement relatively to the body only by frictional engagement of the opposing faces of the rim and body.

4. An armored pneumatic tire comprising a flexible annular inflatable body and a floating rigid armor rim mounted on the periphery of said body, said rim consisting of a metal annulus formed with inwardly extending side flanges approximately parallel to the plane of the axis of the tire, and the flexible body being formed with circumferentially extending outwardly projecting portions forming shoulders to fit between and having approximately parallel side faces to bear outwardly against said side flanges, said outwardly projecting portions having semi-rigid circumferentially extending strands embedded therein and having an outer skin of soft rubber, the rim being supported and held against lateral displacement solely by the flexible body and being held against movement relatively to the body only by frictional engagement of the opposing faces of the rim and body.

5. An armored pneumatic tire comprising a flexible annular inflatable body and a floating rigid armor rim mounted on the periphery of said body, said rim consisting of a metal annulus formed with inwardly extending side flanges approximately parallel to the plane of the axis of the tire, and the flexible body being formed with circumferentially extending outwardly projecting portions forming shoulders to fit between and having approximately parallel side faces to bear outwardly against said side flanges, said outwardly projecting portions having semi-rigid annular strands embedded therein formed of a plurality of wires bent into serpentine form to make the strand slightly extensible.

6. An armored pneumatic tire comprising a flexible annular inflatable body and a floating rigid armor rim mounted on the periphery of said body, said rim consisting of a metal annulus formed with inwardly extending side flanges approximately parallel to the plane of the axis of the tire, and the flexible body being formed with circumferentially extending outwardly projecting portions forming shoulders to fit between and having approximately parallel side faces to bear outwardly against said side flanges, said outwardly projecting portions comprising circumferential strands of semi-rigid material extended inward to strengthen and protect the body at the lines of thrust of the body against the edges of the rim flanges, the rim being supported and held against lateral displacement solely by the flexible body and being held against movement relatively to the body only by frictional engagement of the opposing faces of the rim and body.

7. An armored pneumatic tire comprising a flexible annular inflatable body and a floating rigid armor rim mounted on the periphery of said body, said rim consisting of a metal annulus formed with inwardly extending side flanges approximately parallel to the plane of the axis of the tire, and the flexible body being formed with a layer of strain-resisting material extending from the inner portion thereof about the sides and tread portion thereof and which when the body is inflated is approximately semi-circular in cross-section, and the body having circumferentially extending outwardly projecting portions forming shoulders to fit between and having approximately parallel side faces to bear laterally against said side flanges, said outwardly projecting portions comprising semi-rigid slightly extensible circumferentially extending strands.

8. A flexible annular inflatable tire body formed with a layer of strain-resisting material extending from the inner portion thereof about the sides and tread portion thereof and which is approximately semi-circular in cross-section when the tire body is inflated, and having its peripheral portion formed with circumferentially extending outwardly projecting portions forming shoulders to fit between and having approximately parallel side faces to bear laterally against parallel side flanges of a channeled armor rim, said outwardly projecting portion comprising semi-rigid slightly extensible circumferential strands.

In testimony whereof I have hereunto set my hand in the presence of two subscribing witnesses.

BERNARD GRANVILLE.

Witnesses:
 HORACE G. PRETTYMAN,
 BERT F. SHUMACHER.